United States Patent [19]

Basche et al.

[11] 3,859,144

[45] Jan. 7, 1975

[54] METHOD FOR PRODUCING NICKEL ALLOY BONDING FOIL

[75] Inventors: Malcolm Basche, West Hartford; Urban E. Kuntz, East Hartford, both of Conn.

[73] Assignee: United Aircraft Corporation, East Hartford, Conn.

[22] Filed: June 27, 1973

[21] Appl. No.: 374,226

[52] U.S. Cl............ 148/6.3, 117/106 R, 117/106 A, 117/DIG. 10, 29/498
[51] Int. Cl............................................ C23c 11/02
[58] Field of Search......... 148/6.3, 31.5; 117/106 R, 117/106 A, DIG. 10; 29/498

[56] References Cited
UNITED STATES PATENTS

| | | | |
|---|---|---|---|
| 2,823,151 | 2/1958 | Yntema | 148/31.5 |
| 3,029,162 | 4/1962 | Samuel | 117/107 |
| 3,090,702 | 5/1963 | Commanday | 117/106 R |
| 3,549,424 | 12/1970 | Rice | 117/106 R |
| 3,678,570 | 7/1972 | Paulonis et al. | 29/498 |
| 3,753,794 | 8/1973 | Paulonis et al. | 148/32 |

Primary Examiner—Ralph S. Kendall
Attorney, Agent, or Firm—John D. Del Ponti

[57] ABSTRACT

A method for making a nickel-base interlayer alloy article having utility in the diffusion bonding of the nickel-base superalloys comprising pretreating the surface of the nickel-base article by either (1) boronizing by exposure to a gaseous stream consisting essentially of boron trichloride admixed with hydrogen, the ratio of boron trichloride to hydrogen being no greater than 15/3,500 on a volume basis, or (2) siliconizing by exposure to a gaseous stream of silicon tetrachloride admixed with hydrogen, followed by subsequent boronization of the pretreated article by exposure to a gaseous stream consisting essentially of boron trichloride and hydrogen without regard to the 15/3,500 $BCl_3$-$H_2$ ratio limit.

10 Claims, 2 Drawing Figures

PATENTED JAN 7 1975

3,859,144

METHOD FOR PRODUCING NICKEL ALLOY BONDING FOIL

BACKGROUND OF THE INVENTION

This invention relates to a process for making a coated nickel-base article and more particularly relates to an improved process for producing a surface borided nickel-base interlayer alloy article having utility in the diffusion bonding of the nickel-base superalloys.

Diffusion bonding utilizing transient liquid phase offers vast promise as a joining technique for articles formed from the superalloys. In prior work there have been investigated bonding systems wherein certain brazing and diffusion bonding features have been combined. In these developments, the melting point depressant effect of boron, carbon or silicon together with their high diffusion rates have been utilized as interface materials in diffusion bonding processes, the interface material assuring good initial surface contact in the early stage of the bonding sequence through melting and flow of the interlayer material with subsequent processing providing solid-state bonding. In this regard, reference is made to U.S. Pat. No. 3,678,570 to Paulonis et al. having a common assignee with the present case.

In copending application U.S. Ser. No. 236,500 filed Mar. 20, 1972 by Paulonis et al., now U.S. Pat. No. 3,753,794 common assignee with the present case the concept of an interlayer material for use in a transient liquid phase bonding technique is discussed. As outlined therein the advantages of an article, preferably in foil form, which is sufficiently ductile to permit use between faying surfaces of even complex geometry and formulated to provide optimum composition for effecting a homogeneous diffusion bond are made clear.

Although the potential of such interlayer foil is thus recognized, realization of this potential has awaited the development of an improved process for yielding a consistently reproducible product at a high rate and low cost.

SUMMARY OF THE INVENTION

The present invention relates in general to an improved process for producing a nickel-base interlayer alloy article having utility in the diffusion bonding of the nickel-base superalloys. The invention contemplates the boronization of the surface of the article, after pretreatment, by heating and exposing it to a boron halide hydrogen reactant gas mixture. In a particular embodiment of the invention, a nickel-base article is heated in a reactor to a temperature sufficient to effect boronization of the suface of the article, preferably 720°–960°C, most preferably 800°–900°C and is simultaneously exposed to a gaseous stream in the reactor consisting essentially of boron trichloride admixed with hydrogen to effect said surface boronization, the ratio of boron trichloride to hydrogen during initial exposure being no greater than 15/3,500 on a volume basis.

In an alternate embodiment of the invention, the nickel-base article prior to boronization, is siliconized by heating to a temperature sufficient to effect siliconization of the surface of the article, approximately 720°–960°C, preferably 800°–900°C and exposing to a silicon-containing atmosphere such as silicon tetrachloride and hydrogen.

BRIEF DESCRIPTION OF THE DRAWINGS

An understanding of the invention will become more apparent to those skilled in the art by reference to the following detailed description when viewed in light of the accompanying drawings, wherein.

DESCRIPTION OF THE PREFERRED EMBODIMENT

Figures 1, 2:
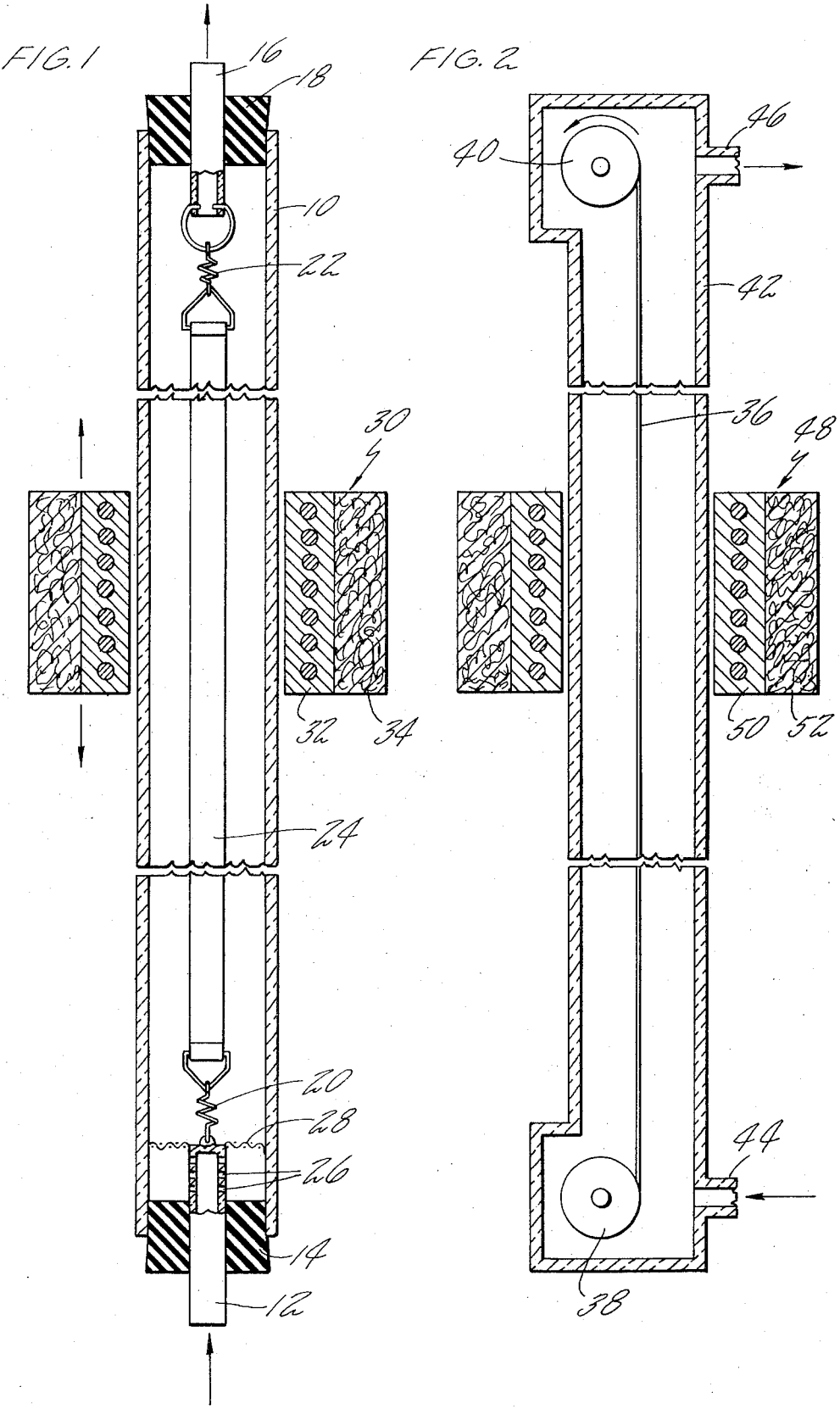
FIG. 1 is a cross-sectional view, in elevation, of a reactor arrangement usable in the practice of the present invention.
FIG. 2 is a cross-sectional view, in elevation, of a modified reactor arrangement usable in the practice of the present invention.

The promise of diffusion bonding techniques for joining the rich superalloys has for some time been recognized, but not very widely applied, principally because of the unsatisfactory nature of the bonds, lack of reproducibility, and the associated problems of quality control. The rich superalloys present particularly unique diffusion bonding problems.

The general results incident to the use of the transient liquid phase diffusion bonding techniques described in the aforementioned U.S. Pat. No. 3,678,570 reveal that, with care, truly outstanding diffusion bonds are indeed possible and practical. However, for production purposes an interlayer material in foil form such as set forth in the above-referenced copending application is almost a necessity.

As used herein, the rich nickel-base superalloys are those having strengths at 1300°F sufficient to limit creep to a maximum of 0.1% in 150 hours under a load of 80,000 psi. These are further typically characterized by the presence of substantial quantities of aluminum and/or titanium, typically in excess of 5 or 6%. Representative of such alloys are those having a representative chemistry as follows: (by weight) 10% Cr, 15% Co, 4.5% Ti, 5.5% Al, 3% Mo, 0.17% C, 1% V, .015% B, 0.06% Zr. Other alloys of the same general type include: Alloy A – 9% Cr, 10% Co, 2% Ti, 5% Al, 7.8% Mo, 12.5% W, 0.15% C, 1% Cb, 0.015% B, 0.05% Zr — and Alloy B – 15% Cr, 15% Co, 3.4% Ti, 4.3% Al, 4.4% Mo, 0.07% C, 0.02% B.

In accordance with the present invention the interlayer foil for diffusion bonding is generally from 0.0005 to 0.005 inch in thickness, and generally from diffusion bonding considerations, as thin as possible preferably about 0.0005 to 0.002 inch thick. Since sufficient melt must be provided to take care of discontinuities between the faying surfaces, foil thickness of 0.002–0.004 are usually used. The compositions of the foil, as mentioned are tailored to provide a suitable homogeneous diffusion bonded joint. For these alloys, boron is the temperature depressant utilized, usually in an amount up to 3.5 weight percent based on the total foil depending upon the degree of temperature depression desired and most often in the range of 2–3.5 weight percent. Beyond about 3.5% boron, the temperature depressant effect reverses and the alloy melting point increases. Thus, the upper boron limit is established by practical considerations.

With such a high boron content, the alloys per se are inherently extremely brittle and in this form (as the boron-containing alloy) they cannot be rolled into foil or be plastically deformed in any manner without fracture.

In order to not only produce the boron-containing foil but also to provide one suitable for diffusion bonding and usable with joints of complex configuration, the basic foil is produced in two distinct stages. A basis alloy minus the embrittling element or elements, i.e., minus those elements in such quantity to substantially destroy ductility, is first provided in foil form. This is, of course, no problem since in the absence of the embrittling elements the alloy is ductile. Subsequent to the preparation of the basis alloy foil, the surface thereof is boronized using the inventive technique herein described.

The thickness of the foil is established in the ductile form and the boronizing process may be closely controlled to provide the precise boron level desired. As previously mentioned, the minimum quantity of boron provided at the interface is that necessary to effect the temperature depression effect desired. The maximum on the other hand is that which can be readily diffused away without having any harmful residual effect at or adjacent to the joint area.

Two factors influence the total quantity of boron provided, i.e., the concentration and the depth to which the boronizing is effected. Boronizing cannot be effected such as to drive substantial boron entirely through the foil while retaining ductility of the foil. Generally, a ductile core of at least 25% of the total thickness should be maintained and usually the requisite quantity of boron can be provided if boronizing is essentially confined to a penetration of about 30% per side of foil.

In the boronizing process, the boron is not provided in the foil as elemental boron for the most part but rather as rather high melting point borides which are the reaction product of boron with the substrate elements. Although the borides are brittle, they are nevertheless adherent. Accordingly, when properly boronized, the surface of the foil may crack when bent severely but the surface will not peel or flake off and the core will retain its integrity.

As previously observed, the surface of the foil comprises borides. These have a melting point in excess of that desired for the diffusion bonding operation. For this reason if substantial boron is introduced entirely through the foil not only is foil ductility destroyed, but the foil is otherwise normally unusable for the purpose intended because it cannot be melted in the range desired for the diffusion bonding operation. For the same reason, the foil of the present invention having a ductile core with a boronized outer layer first melts not at the outer surface of the foil but at the boronized layer/ductile core interface. Thus, for proper operation in the diffusion bonding process, the foil is dependent upon the retention of a substantially unboronized core in contact with a boronized outer layer.

Referring now to the drawings, there is illustrated in FIG. 1 a reactor apparatus which is suitably employed in the process of the invention. The apparatus comprises a vertical containment vessel 10 having a gas inlet 12 through a bottom end closure 14, preferably a rubber plug and a gas outlet 16 through a top end closure 18 also a rubber plug. The containment vessel is preferably quartz or Vycor although a wide variety of other materials are suitable. The cross-sectional shape of the vessel is not critical and both circular and rectangular sections are considered satisfactory. Attached to the inlet 12 and outlet 14 are spring members 20 and 22 which are secured to opposite ends of foil strip 24. In order to promote circulation of the incoming reactant gas, the gas inlet tube 12 is closed at its upper end and is provided with wall perforations 26 while a wire screen 28 is deployed across the cross section of the vessel 10 between the inlet tube 12 and the foil strip 24. Heating means 30 comprising resistance core 32 and insulation 34 is concentric with the vessel 10 and encircles the same. Although not shown, means are provided to move the heater 30 up and down the length of the vessel 10 as indicated by the arrows in the drawing.

In a modified form of the invention as shown in FIG. 2, reactor apparatus is provided for the continuous production of bonded nickel-base interlayer alloy foil. In this embodiment, a continuous supply of foil 36 passes from a supply roll 38 to a take-up roll 40, all of which are housed within a vertical reactor vessel enclosure 42. At the lower end of the enclosure 42, there is provided a gas inlet 44 while at the upper end, there is provided a gas outlet 46. Stationary heater 48 comprising coil 50 and insulation 52, as in FIG. 1, is concentric with the reactor and encircles the same.

A number of interlayer foils were produced and tested as evidenced by the following examples. In general, it was found that in order to produce satisfactory boronization of nickel-base articles of relatively low silicon content, the article must be pretreated, prior to boronization by either an initial or "flash" boriding step or an initial siliconizing step. In pretreating by flash boriding, the article is heated to a temperature sufficient to effect boronization of the surface thereof, preferably to approximately 720°–960°C and most preferably 800°–900°C, while simultaneously exposing the same to a gaseous stream in the reactor consisting essentially of boron trichloride and hydrogen, the ratio of boron trichloride to hydrogen during initial exposure being no greater than 15/3,500 on a volume basis. Subsequently boronization may be continued by exposure to the same or higher $BCl_3$ concentrations. In pretreating by initial siliconization, the article is heated to a temperature sufficient to effect siliconization of the surface thereof, preferably to approximately 720°–960°C and most preferably 800°–900°C, while simultaneously exposing the same to a gaseous stream containing $SiCl_4$ and $H_2$. In particular a gas mixture consisting essentially of approximately, in mol percent, 6–14% $SiCl_4$, 54–82% $H_2$ and 12–32% A is suitable, although argon is not considered necessary.

Where indicated in the examples, the borided products were subjected to a test to indicate the level of chloride contained therein. The test consisted of wrapping the borided product in aluminum foil, inserting the wrapped product into a ceramic furnace heated to approximately 1080°C with a stream of argon flowing therethrough, putting wet Congo Red paper adjacent the exhaust end and after one minute ascertaining if the paper turns blue. If so, the indication is a chlorine content at or above eight ppm which indicated the likelihood of poor bonding with as low as only 30% of bonded area. If the paper did not turn blue, the indication was of a chlorine content of less than eight ppm and borided strips which passed this test gave good bonds, i.e., bonds at least equal in strength of the parent metal with tensile strengths of at least approximately 60,000–90,000 psi and a bonded area of approximately 90%. Some of the parent metals bonded together by the borided foils of the present invention consisted essentially of, by weight (nominal): 9 Cr, 10 Co, 12.5 W, 1 Cb, 2 Ti, 5 Al, 2 Hf, 0.015 B; remainder Ni and 21 Cr, 11 W, 1.75 (Cb + Ta), 2 Fe remainder Co as well as Inco 713. The alloys were bonded together in a vacuum of 2–4 psi at 2125°F for 24 hours.

Example 1

Using the apparatus of FIG. 1 with a vessel 10 of approximately 3 feet in length and a heater 30 having a length of 2.5 inches, a 1.5 inch wide, 0.004 inch thick foil strip of nickel-base alloy was secured by springs 20 and 22 in the reactor as shown in the drawing. The composition of the foil consisted essentially of, by weight percent, 20.04 Cr, 1.38 Si, 0.031 C, 0.17 Al, 0.02 Mn, 0.004 S, 0.02 Mo, 0.03 Cu, 0.56 Fe, 0.06 Ca, 0.07 Zr, 0.14 Co, balance Ni. The strip was heated sequentially from top to bottom to a temperature of 820°–860°C with the furnace moving at a speed of 10.6 inches/hour while a mixture of reactant gas comprising 15 cc/min $BCl_3$ and 1,700 cc/min $H_2$ was pumped into the reactor through inlet 12. The resulting borided product produced essentially void-free strong bond samples.

Example 2

Example 1 was repeated except that the composition of the foil was, by weight percent, 19.74 Cr, 0.01–.1 Si, 0.001–.0001 Al, 0.005–.05 Mn, 0.01–.1 Cu, 0.05–.5 Fe, 0.01–.1 Ca, 0.01–.1 Co, 0.01–.1 Ti, 0.005–.05 Mg, balance Ni. In this example, the sample bonds made with the resulting product were weak and contained large voids.

Example 3

Example 2 was repeated except that the reactant gas mixture was introduced at a ratio of 18.2 cc/min $BCl_3$ and 1,300 cc/min $H_2$. The sample bonds were weak and contained large voids.

Example 4

Example 2 was repeated except that the reactant gas mixture was introduced at a ratio of 22.3 cc/min $BCl_3$ and 2,500 cc/min $H_2$. Results were marginal. Sample bonds were generally good but tests showed that questionably high amounts of metal chloride were present in the foil strip.

Example 5

Example 2 was again repeated, this time with a reactant gas mixture at a ratio of 15 cc/min $BCl_3$ and 3,400 cc/min $H_2$. Results were better. Sample bonds were good although the chloride test periodically showed questionable amounts of metal chloride.

Example 6

Example 2 was repeated, but this time was run in two stages. First the foil was preborided (flash borided) by exposure, at 820°–860°C, with the furnace moving top to bottom at a rate of 41.4 inches/hour while a mixture of reactant gas comprising 7.0 cc/min $BCl_3$ and 3,400 cc/min $H_2$ was introduced into the reactor. Subsequently, the furnace was moved from bottom to top at rate of 12 inches/hour with a gas mixture flow of 15 cc/min $BCl_3$ and 1,700 cc/min $H_2$. The resulting borided product had a low chloride level (below eight ppm) and produced essentially void-free strong bond samples.

Example 7

Example 6 was repeated except that in the second step the furnace was moved at a rate of 41.4 inches/hour and the gas mixture flow was 5.1 cc/min $BCl_3$ and 1,700 cc/min $H_2$. The resulting borided product had a low chloride level (below eight ppm) and produced essentially void-free strong bonds.

Example 8

Example 7 was repeated except that in the second step the flow comprises 14.0 cc/min $BCl_3$ and 1,700 cc/min $H_2$. Results were the same as Example 7.

Example 9

Example 7 was repeated except that in the second step the flow comprised 73 cc/min $BCl_3$ and 1,700 cc/min $H_2$. Results were the same as Example 7.

Example 10

Using the apparatus of FIG. 2 with the supply and take-up rolls 38 and 40 approximately 3 feet apart and the stationary heater 48 having a length of 12 inches, a 1.5 inch wide 0.004 inch thick nickel-base alloy foil strip of the same composition as that set forth in Example 2 was preborided by moving the strip upwardly onto the take-up spool passed the heater at a speed of 220 feet/hour. The strip temperature opposite the furnace was 830°C and the gas flow into inlet 44 was 14 cc/min $BCl_3$ and 6,800 cc/min $H_2$. The preborided tape was then borided by moving it up from roll 38 onto roll 40 at a speed of 15.7 feet/hour. The strip was again heated to 830°C opposite the furnace 48 while flow was maintained at 222 cc/min $BCl_3$ and 3,400 cc/min $H_2$. The resultant tape had a low chloride level (less than 8 ppm) and produced essentially void-free strong bonds.

Example 11

Example 10 was repeated except that during preboriding the temperature was 990°C and during boriding the temperature was 1,020°C and speed was 20 feet/hour. The resultant tape had an unsatisfactorily high chloride level.

Example 12

Using the apparatus and foil strip of Example 2, the strip was presiliconized by heating sequentially from top to bottom to a temperature of 820°–860°C with a furnace moving at a speed of 11.05 inches/hour while a reactant gas mixture comprising 1,000 cc/min of argon which had been bubbled through silicon tetrachloride at room temperature and 1,700 cc/min hydrogen was pumped into the reactor through inlet 12. The reactant gas mixture consisted essentially of approximately, in mol percent, 14% $SiCl_4$, 54% $H_2$, and 32% A. Subsequently the reactor was purged and the presiliconized tape therewithin was heated to 820°–860°C by moving the furnace from bottom to top at a rate of 12.4 inches/hour while a mixture of reactant gas comprising 15 cc/min $BCl_3$ and 1,700 cc/min $H_2$ was introduced into the reactor. The resulting borided product had a low chloride level indicating that void-free strong bonds would be produced.

Example 13

Example 12 was repeated except that the presiliconizing reactant gas mixture comprised 260 cc/min of argon that had been bubbled through silicon tetrachloride at room temperature and 1,700 cc/min hydrogen and the furnace was moved at a rate of 12.4 inches/hour. The reactant gas mixture consisted essentially of approximately, in mol percent, 6% $SiCl_4$, 82% $H_2$ and 12% A. The presiliconized foil was borided as in the previous example and the resulting product had a low chloride level indicating that void-free strong bonds would be produced.

Example 14

Example 13 was repeated except that the furnace during presiliconizing was moved at a rate of 41 inches/hour. The resulting borided product appeared suitable for producing strong bonds and again had a low chloride content.

Examples 15–23

Using the FIG. 1 apparatus, several foil strips, ranging from 0.001 to 0.010 inch in thickness, were subjected to preboriding at a temperature of 720°–960°C and $BCl_3$ to hydrogen volume ratio of no greater than 15/3,500 and subsequently borided to produce a borided foil product which in turn, gave good bond results. The compositions of the strips, prior to preboriding, were:

16.5 Cr, 4 Fe, 4 Si, Bal Ni
7 Cr, 4 Si, 3 Fe, Bal Ni
4.5 Si, Bal Ni
3.5 Si, Bal Ni
4.5 Si, 20 Co, Bal Ni
12 W, 10 Cr, 3.5 Fe, 3.5 Si, Bal Ni
14–16 Cr, 0.15 other, Bal Ni
14–16 Cr, 14–16 Co, 0.15 other, Bal Ni
14–16 Cr, 14–16 Co, 4.5–5.5 Mo, 0.15 other, Bal Ni Although it was originally felt that the interlayer foil would not be particularly sensitive to the boronizing process actually used in its manufacture, it was found as indicated in the above examples, that a process utilizing the direct reaction from gaseous $BCl_3$ and $H_2$, particularly at the higher initial $BCl_3$ concentrations, very often produces nonuniform results unless the operating parameters, particularly the composition of the reactant gas during initial exposure of the virgin strip thereto are closely controlled.

As indicated, the article must be pretreated prior to boronization by an initial step of either flash boriding or siliconizing, followed by boronization. In pretreating by flash boriding, the nickel-base article is heated to a temperature sufficient to effect boronization of the surface thereof, preferably to a temperature of approximately 720°–960°C, most preferably 800°–900°C, while simultaneously exposing the same to a gaseous stream in the reactor consisting essentially of boron trichloride and hydrogen at a ratio of boron trichloride to hydrogen of no greater than 15/3,500, on a volume basis. In pretreating by siliconization, the article is heated to a temperature to effect siliconization of the surface thereof, preferably to a temperature of approximately 720°–960°C, most preferably 800°–900°C, while simultaneously exposing the same to a gaseous stream in the reactor to $SiCl_4$ and $H_2$, with or without an inert gas such as A. Subsequent to pretreatment, the article is exposed, at the selected temperature, to $BCl_3/H_2$ concentrations without regard to the 15/3,500 $BCl_3$ to $H_2$ pretreatment ratio limitation.

It was also found that, in a vertical reactor configuration with upward gas flow, it is preferred that the initial heating sequence, whether by a moving furnace such as shown in FIG. 1 or a moving foil sheet as in FIG. 2, be such so as to prevent gaseous reaction products from contacting virgin unborided portions of the sheet. In order to do so, the strip is sequentially heated from its upper portion to its lower portion thus keeping the initially borided surface above the virgin unborided portions of the sheet. It will be appreciated however, that while a vertical reactor configuration is preferred, it appears that a horizontal configuration could also be utilized. Overall, the key appears to be to keep the direction of gas flow concurrent with the direction in which the article is heated. In the same light, it also appears that other type heating means than that described could be employed such as self-resistance, induction, etc., so long as the sheet is heated uniformly.

It will be appreciated by those skilled in the art that the continuous process associated with FIG. 2 could be modified so as to pass the upwardly moving strip 36 through more than one reactor zone. It is contemplated, for example, that the strip would first be passed through a first reactor zone where it would be heated and exposed to the $SiCl_4$ gas mixture of the low $BCl_3$ (no greater than 15/3,500) gas mixture and immediately and continuously passed through a second reactor or reactor zone where it would be heated and exposed to a relatively higher $BCl_3$ concentration.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A method for making a nickel-base interlayer alloy article having utility in the diffusion bonding of the nickel-base superalloys comprising:
   heating a nickel-base article in a reactor to a temperature sufficient to effect boronization of the surface of said article; and
   exposing said article to a gaseous stream in the reactor consisting essentially of boron trichloride admixed with hydrogen to effect boronization of the surface of said article, the ratio of boron trichloride to hydrogen during initial exposure being no greater than 15/3,500 on a volume basis.

2. The method of claim 1 wherein said article is heated to 720°–960°C.

3. The method of claim 2 wherein said article is heated to 800°–900°C.

4. The method of claim 1 wherein said nickel-base article is a foil sheet 0.0005–0.015 inch thick.

5. A method for making a nickel-base interlayer alloy article having utility in the diffusion bonding of the nickel-base superalloys comprising:
   heating a nickel-base article in a reactor to approximately 720°–960°C;
   exposing said article to a first gaseous stream of silicon tetrachloride and hydrogen to effect siliconization of the surface of said article;
   subsequently heating said siliconized article to a temperature sufficient to effect boronization of the surface thereof; and
   exposing said article to a second gaseous stream consisting essentially of boron trichloride admixed with hydrogen to effect boronization of the surface thereof.

6. The method of claim 5 wherein said temperature during siliconization is 800°–900°C.

7. The method of claim 6 wherein said nickel-base article is a foil sheet 0.0005–0.015 inch thick.

8. The method of claim 7 wherein said first gaseous stream consists essentially of approximately, in mol percent, 6–14% $SiCl_4$, 54–82% $H_2$ and 12–32% A.

9. A method for making a nickel-base interlayer alloy article having utility in the diffusion bonding of the nickel-base superalloys comprising:

positioning an elongated nickel-base alloy foil sheet vertically in a reactor;

initially exposing said sheet to a gaseous stream in the reactor consisting essentially of boron trichloride admixed with hydrogen, the ratio of boron trichloride to hydrogen being no greater than 15/3,500 on a volume basis; and sequentially heating said sheet portion thereof in a direction concurrent with said gaseous stream to effect boronization of the surface of said sheet.

10. The method of claim 8 wherein said surface boronized sheet is subsequently heated and exposed to a gas mixture of boron trichloride and hydrogen in a ratio greater than 15/3,500 on a volume basis to effect further boronization of its surface.

* * * * *